(12) United States Patent
Fujiuchi et al.

(10) Patent No.: US 7,552,610 B2
(45) Date of Patent: Jun. 30, 2009

(54) THREAD FORMING METHOD, THREAD FORMING DEVICE, AND THREAD FORMING TOOL

(75) Inventors: Hiroki Fujiuchi, Tochigi (JP); Toshihiro Murakawa, Tochigi (JP); Naoki Takahashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 11/555,269

(22) Filed: Oct. 31, 2006

(65) Prior Publication Data

US 2007/0101787 A1 May 10, 2007

(30) Foreign Application Priority Data

Nov. 1, 2005 (JP) ............................. 2005-318271

(51) Int. Cl.
 B21C 37/29 (2006.01)
 B21H 3/02 (2006.01)
 B21J 13/02 (2006.01)
(52) U.S. Cl. ............................. 72/71; 470/84; 470/206
(58) Field of Classification Search ............... 72/55, 72/71; 470/66, 84, 198, 199, 204; 408/222, 408/215
See application file for complete search history.

(56) References Cited

U.S. PATENT DOCUMENTS

| 4,571,687 | A | 2/1986 | Fukuyama et al. |
| 4,831,674 | A | 5/1989 | Bergstrom et al. |
| 6,931,901 | B2 * | 8/2005 | Ghiran et al. .................. 72/55 |
| 2006/0120826 | A1 * | 6/2006 | Wieser et al. ............ 411/387.4 |

FOREIGN PATENT DOCUMENTS

| GB | 2 067 440 | 7/1981 |
| JP | 05-253747 | 10/1993 |

* cited by examiner

Primary Examiner—Dana Ross
Assistant Examiner—Teresa Bonk
(74) Attorney, Agent, or Firm—Rankin, Hill & Clark LLP

(57) ABSTRACT

A thread forming device 10a is provided with a thread forming tool 32 for forming a thread portion 14 at a frame 12, a first motor 38 for controlling to rotate the thread forming tool 32, and a second motor 40 for controlling to extract and retract the thread forming tool 32. Further, the thread forming tool 32 is provided with a pilot hole forming portion 86 provided with a spiral groove 80b at a front end portion 80 in a taper shape, and a thread forming portion 84 constituted continuously to the pilot hole forming portion 86 and provided with a spiral groove 84b.

6 Claims, 14 Drawing Sheets

US 7,552,610 B2

THREAD FORMING METHOD, THREAD FORMING DEVICE, AND THREAD FORMING TOOL

This present application claims the priority from Japanese Patent Application (No. 2005-318271) filed on Nov. 1, 2005, and the contents of which are hereby incorporated by reference.

BACKGROUND OF THE INVENTION

1. Field of the Invention

The present invention relates to a thread forming method, a thread forming device and a thread forming tool for forming a thread portion for fastening other plate member or the like to a metal plate.

2. Related Art

In a related art, as a method for screw cramping-a metal plate used in a vehicle or the like, there is used a thread portion forming method for forming a thread portion at a predetermined position of the metal plate by subjecting the metal plate to burring and threading.

JP-A-05-253747 discloses a tapping tool including a boring portion for forming a pilot hole by burring by breaking a thin plate while plastically deforming the thin plate by friction heat by pressing and rotating by a front end thereof in a taper shape, and a tapping portion for forming an internal thread at the pilot hole formed by the boring portion and forming a dull processing face at the boring portion.

However, according to the constitution of JP-A-05-253747, as shown by FIG. 16A, in burring, a large portion of a press force exerted from a boring portion 2 to a thin plate 3 is applied in a direction indicated by an arrow mark in FIG. 16A, that is, a skewed lower direction. Therefore, as shown by FIG. 14, there poses a problem that a plate thickness at a front end portion of a thread portion 1 is reduced, and a strength of an internal thread is reduced. Further, when a press speed of a tool is constituted by a high speed (for example, about 10 mm/sec), as shown by FIG. 15, a shape of the thread portion 1 becomes nonuniform, a front end thereof is broken. Therefore, the press speed of the tool needs to be constituted by a low speed (for example, about 1.5 mm/sec) to pose a problem that a forming time period is increased.

SUMMARY OF THE INVENTION

One or more embodiments of the invention provide a thread forming method, a thread forming device and a thread forming tool capable of increasing a strength and a speed of processing an internal thread when the internal thread is formed on a metal plate.

In accordance with one or more embodiments of the invention, there is provided a thread forming method using a thread forming tool including a pilot hole forming portion provided with a first spiral groove at a front end portion thereof in a taper shape and a thread forming portion continuous to the pilot hole forming portion and provided with a second spiral groove, and the thread forming method is provided with a first step of pressing the thread forming tool to a metal plate while rotating the thread forming tool to thereby form a hole at the metal plate by the pilot hole forming portion, and a second step of forming an internal thread at the hole by the thread forming portion by rotating the thread forming tool after the first step. An advancing direction of the first spiral groove in an axial direction relative to the metal plate in the first step is constituted by a direction reverse to an advancing direction of the second spiral groove in the axial direction relative to the metal plate in the second step. That is, at the second step, the thread forming tool is rotated to form the thread at the hole by the second spiral groove. On the other hand, at the first step, the thread forming tool is rotated in a direction reverse to a rotational direction for forming the thread by the first spiral groove, and a pilot hole is formed by the first spiral groove.

According to the method of such a constitution, at the first step, a direction of a press force from the pilot hole forming portion to the metal plate is produced in a lower direction and a skewed lower direction and therefore, a plate thickness for the pilot hole can be ensured, a strength of the thread portion can be increased, and a processing speed can be increased.

Further, the direction of the spiral of the first spiral groove and the direction of the spiral of the second spiral groove may be constituted by the same direction. In this case, by constituting a rotational direction of the thread forming tool at the first step and a rotational direction of the thread forming tool at the second step by directions reverse to each other, the thread portion can be formed by the single thread forming tool.

Furthermore, the direction of the spiral of the first spiral groove and the direction of the spiral of the second spiral groove may be constituted by directions reverse to each other. In this case, by constituting the rotational direction of the thread forming tool at the first step and the rotational direction of the thread forming tool at the second step by the same direction, processing steps can be reduced and an operational efficiency can be increased.

In accordance with one or more embodiments of the invention, a thread forming device is provided with a thread forming tool for forming an internal thread at a metal plate, a rotation drive portion for rotating the thread forming tool, and an extraction and retraction drive portion for extracting and retracting the thread forming tool. The thread forming tool includes a pilot hole forming portion provided with a first spiral groove at a front end portion thereof in a taper shape, and a thread forming portion continuous to the pilot hole forming portion and provided with a second spiral groove.

According to the device having such a constitution, the direction of the press force from the pilot hole forming portion to the metal plate is produced in the lower direction and the skewed lower direction and therefore, the plate thickness for the pilot hole can be ensured, the strength of the thread portion can be increased, and the processing speed can be increased.

Further, the thread forming device may further be provided with a control unit for controlling the rotation drive portion and the extraction and retraction drive portion, wherein the control unit controls the rotation drive portion such that an advancing direction of the first spiral groove in an axial direction in a step of forming a hole at the metal plate by the pilot hole forming portion by pressing the thread forming tool to the metal plate constitutes a direction reverse to a direction of pressing the metal plate by the thread forming portion in a step of forming the internal thread. That is, at the second step of forming the internal thread at the hole, the thread forming tool is rotated to form the thread at the hole by the second spiral groove. On the other hand, at the first step of forming the hole at the metal plate, the thread forming tool is rotated in the direction reverse to the rotational direction for forming the thread by the first spiral groove, and the pilot hole is formed by the first spiral groove.

Further, the thread forming device may be further provided with a control unit for controlling the rotation drive portion and the extraction and retraction drive portion wherein a direction of a spiral of the first spiral groove and a direction of a spiral of the second spiral groove are constituted by the same direction. In this case, there may be constructed a constitution in which the control unit controls the rotation drive portion such that a rotational direction of the thread forming tool in a first step of forming a hole at the metal plate by the pilot hole forming portion by pressing the metal plate while rotating the thread forming tool and the rotational direction of the thread forming tool in a second step of forming an internal thread at the hole by the thread forming portion by rotating the thread forming tool after the first step are constituted by directions reverse to each other.

Furthermore, the thread forming device may be further provided with a control unit for controlling the rotation drive portion and the extraction and retraction drive portion, wherein a direction of the spiral of the first spiral groove and a direction of the spiral of the second spiral groove are constituted by directions reverse to each other. In this case, there may be constructed a constitution in which the control unit controls the rotation drive portion such that a rotational direction of the thread forming tool in a first step of forming a hole at the metal plate by the pilot hole forming portion by pressing the metal plate while rotating the thread forming tool and a rotational direction of the thread forming tool in a second step of forming an internal thread at the hole by the thread forming portion by rotating the thread forming tool after the first step are constituted by the same direction.

Further, in accordance with one or more embodiments of the invention, a thread forming tool is provided with a pilot hole forming portion including a first spiral groove at a front end portion thereof in a taper shape, and a thread forming portion continuous to the pilot hole forming portion and including a second spiral groove, wherein a direction of a spiral of the first spiral groove and a direction of a spiral of the second spiral groove are constituted by the same direction or directions reverse to each other.

According to the thread forming tool having such a constitution, the pilot hole can be formed and the thread can be formed by the single thread forming tool. Further, by the first spiral groove, the direction of the press force from the pilot hole forming portion to the metal plate is produced in the lower direction and the skewed lower direction and therefore, the plate thickness of the pilot hole can be ensured. Thereby, the strength of the thread portion can be increased, and the processing speed can be increased.

According to the embodiments of the invention, there is provided the thread forming method and the thread forming device capable of increasing the strength of the thread and the speed of processing the thread when the internal thread is formed by forming the pilot hole and forming the thread at the metal plate. Further, according to the embodiments of the invention, there is provided the thread forming tool capable of forming the internal thread having the sufficient strength even when the speed of processing the metal plate is constituted by a high speed.

Other aspects and advantages of the invention will be apparent from the following description and the appended claims.

DETAILED DESCRIPTION OF THE EXEMPLARY EMBODIMENTS

An explanation will be given of exemplary embodiments of a thread forming device and a thread forming tool as well as a thread forming method in reference to the drawings as follows.

Figure 1:
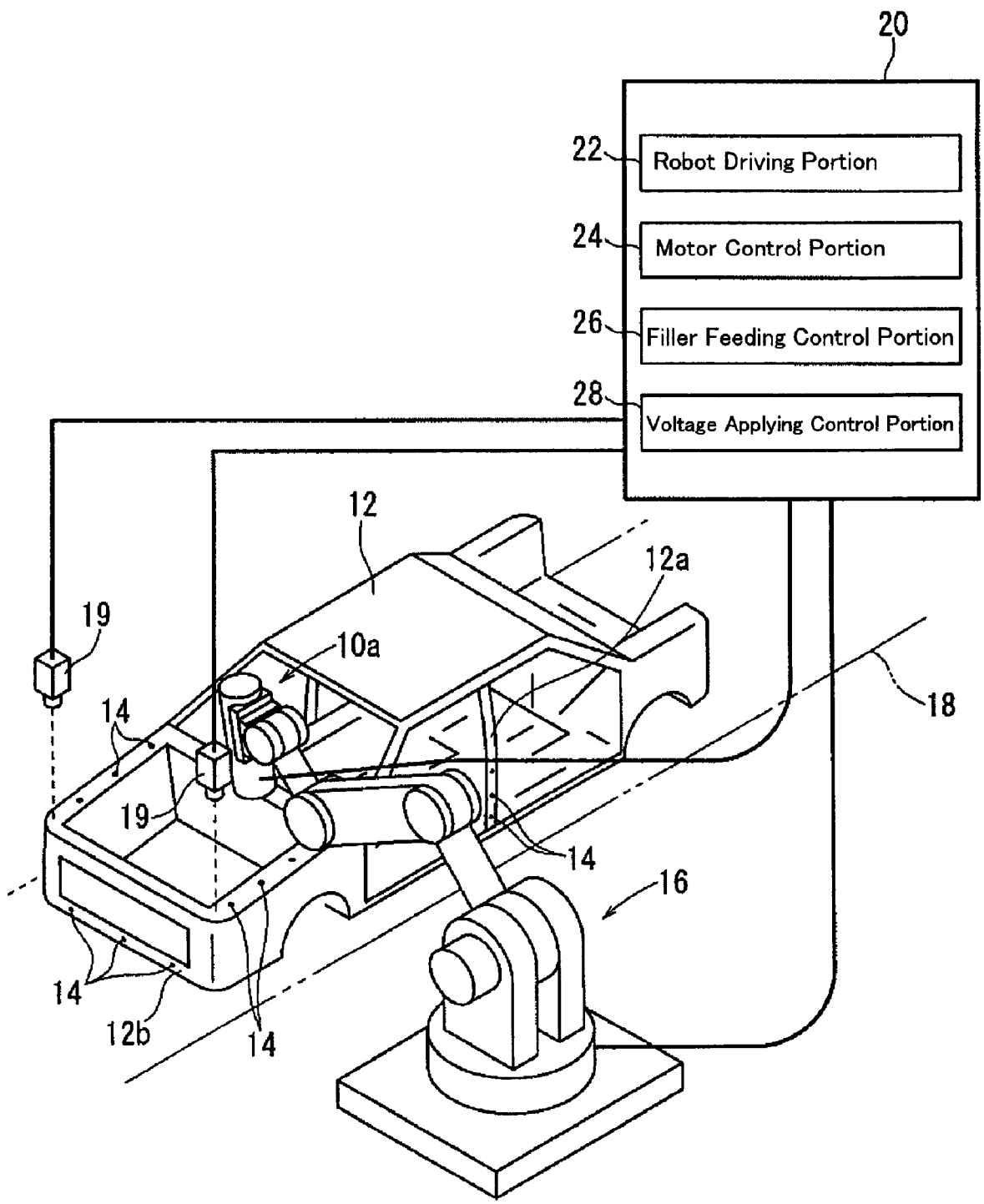
FIG. 1 is an outline functional block diagram of a robot including a thread forming device and a controller.

A first exemplary embodiment of the invention will be described in details in reference to the drawings. FIG. 1 is an outline functional block diagram of a robot including a thread forming device and a controller.

As shown by FIG. 1, a thread forming device 10a according to the first exemplary embodiment is a unit type apparatus for forming a thread portion 14 at a predetermined portion of a frame 12 as a metal plate of a vehicle before being coated and is provided attachably and detachably to a front end of a robot 16. The robot 16 is of an articulated type for industrial use, and the thread forming device 10a can be set at an arbitrary position by an arbitrary attitude within an operational range of the robot 16. Thereby, the thread forming device 10a can be arranged opposed to, for example, a door hinge portion 12a or a bumper beam portion 12b and can form the thread portions 14 at the portions.

The frame 12 is transferred on a transfer line 18 and is temporarily stopped at a vicinity of the robot 16 to confirm an accurate position thereof by a camera 19. Further, after the frame 12 has been processed to form the thread portion 14 by the thread forming device 10a, the frame 12 is transferred to a station of a next step along the transfer line 18, thereafter, an unprocessed successive one of the frame 12 is transferred to the vicinity of the robot 16.

The robot 16 and the thread forming device 10a are controlled by a controller 20 as a control unit. The controller 20 includes a robot driving portion 22 for operating the robot 16 based on predetermined instruction data, a motor control portion 24 for driving a first motor 38 and a second motor 40 (refer to FIG. 2) at inside of the thread forming device 10a, a filler feeding control portion 26 for feeding a filler 62 (refer to FIG. 2), and a voltage applying control portion 28 for applying a high voltage to the filler 62. Further, the controller 20 can confirm positions of the frame 12 and a thread portion processing position P based on an image provided from the camera 19.

Figure 2:
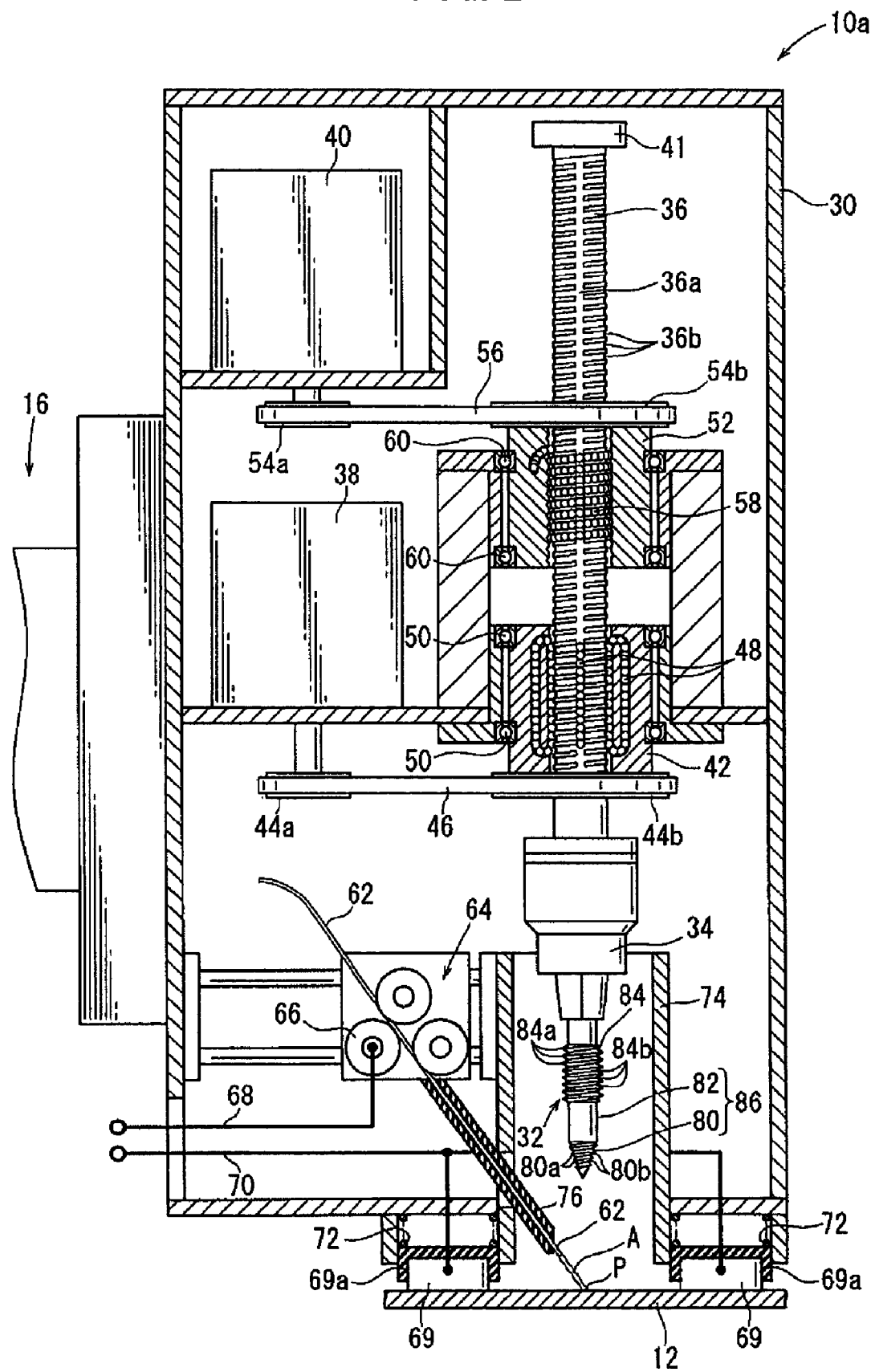
FIG. 2 is a side sectional view of a thread forming device according to a first exemplary embodiment of the invention.

FIG. 2 shows a side sectional view of the thread forming device 10a according to the first exemplary embodiment. As shown by FIG. 2, the thread forming device 10a is constituted by constituting a base by a housing 30 and includes a thread forming tool 32, a chuck 34 for holding the thread forming tool 32, a ball screw 36 connected to the chuck 34, the first motor 38 for rotating the ball screw 36, and the second motor 40 for driving to extract and retract the ball screw 36. Further, the thread forming tool 32 is constituted by a metal of, for example, high speed tool steel or the like. Further, the robot 16 is connected to a side face of the housing 30.

The first motor 38 and the second motor 40 are arranged to align in series and aligned in parallel with the ball screw 36. Further, an upper end portion of the ball screw 36 is provided with a stopper 41 for preventing the ball screw 36 from being drawn out.

The ball screw 36 is axially supported by a spline nut 42 extractably and retractably, and the spline nut 42 is driven to rotate by the first motor 38 by way of pulleys 44a, 44b and a belt 46. Further, the pulleys 44a, 44b achieve an operation of reducing a rotational speed of the first motor 38.

Further, the spline nut 42 is provided with a ball group 48 circulated in an axial direction, and a portion of the ball group 48 is projected slightly from an inner face of the spline nut 42 to be engaged with a plurality of spline grooves 36a of the ball screw 36. Further, the ball group 48 is driven to circulate by passing an inner path provided at inside of the spline nut 42. The ball screw 36 can smoothly be extracted and retracted by an operation of rolling the ball group 48. Further, since a portion of the ball group 48 is engaged with the spline grooves 36a, by driving to rotate the spline nut 42 by the first motor 38, the ball screw 36 is driven to rotate along with the spline nut 42. Here, the spline nut 42 is supported by the housing 30 by way of a bearing 50 and a predetermined bracket and can be rotated smoothly.

On the other hand, the ball screw 36 is axially supported rotatably by a ball screw nut 52, and the ball screw nut 52 is driven to rotate by the second motor 40 by way of pulleys 54a, 54b and a belt 56. Further, the pulleys 54a, 54b achieve an operation of reducing a rotational speed of the second motor 40.

The ball screw nut 52 is arranged on an upper side of the spline nut 42 and in series therewith by way of a predetermined clearance therebetween. The ball screw nut 52 is provided with a ball group 58 which is spirally circulated, and a portion of the ball group 58 is projected slightly from an inner face of the nut 52 to be engaged with a spiral groove 36b of the ball screw 36. The ball group 58 is driven to circulate by passing an inner path provided at inside of the ball screw nut 52. Further, since a portion of the ball group 58 is engaged with the spiral groove 36b, by driving to rotate the ball screw nut 52 by the second motor 40, the ball screw 36 drives to extract and retract the nut 52 smoothly. The ball screw nut 52 is supported by the housing 30 by way of a bearing 60 and a predetermined bracket and can smoothly be rotated.

As described above, the first motor 38 and the spline nut 42 and the like are operated as a portion of driving to rotate the thread forming device 10a, and the second motor 40 and the ball screw nut 52 and the like are operated as a portion of driving to extract and retract the thread forming device 10a.

Further, the thread forming device 10a includes a roller mechanism 64 for feeding a filler 62 to the thread portion processing position P, a positive electrode 68 connected to a roller 66 constituting one of a plurality of rollers constituting the roller mechanism 64, and a plurality of negative electrode plates 69 arranged centering on the thread portion processing position P at a lower end portion of the thread forming device 10a. Further, the respective negative electrode plates 69 are respectively connected to a negative electrode 70 and insulated from the housing 30 by an insulating member 69a.

Here, the roller 66 is made of a metal, and the filler 62 and the positive electrode 68 are electrically conducted. Further, the negative electrode plate 69 is elastically brought into contact with the frame 12 under operation of a spring 72 to be electrically conducted therewith. Further, the positive electrode 68 and the negative electrode 70 are connected to the voltage applying control portion 28, and a high voltage can be applied between a front end portion of the filler 62 arranged at a vicinity of the thread portion processing position P and the frame 12.

Further, a lower side of the thread forming device 10a is provided with an insulating inner cylinder 74, and the thread forming tool 32 is driven to extract and retract at inside of the insulating inner cylinder 74. The filler 62 is fed bypassing inside of an insulating tube 76 extended in a direction of the thread portion processing position P.

Figure 3:
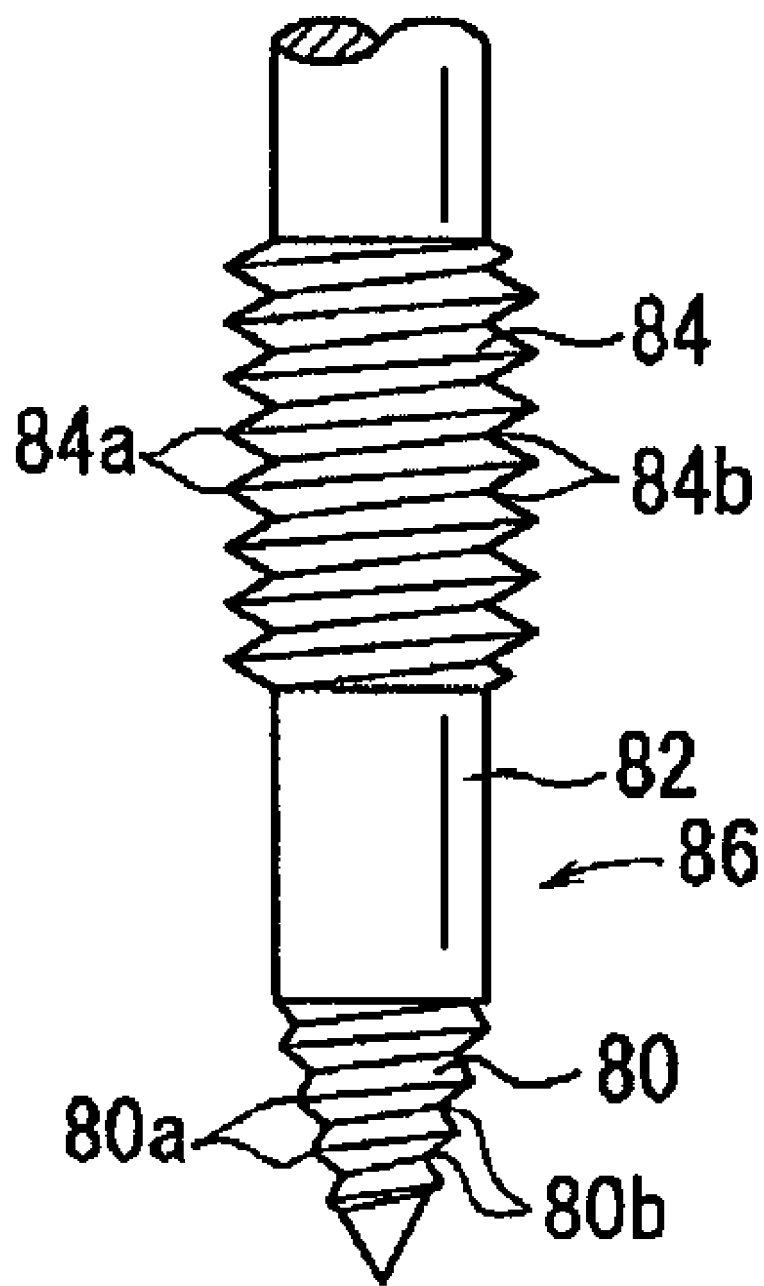
FIG. 3 is a front view enlarging a thread forming tool according to the first exemplary embodiment.

FIG. 3 is a front view of enlarging the thread forming tool 32 according to the first exemplary embodiment. As shown by FIG. 2 and FIG. 3, the thread forming tool 32 includes a front end portion 80 in a taper shape, a circular column portion 82 provided continuously to an upper side of the front end portion 80, and a thread forming portion 84 provided continuously to an upper side of the circular column portion 82.

The front end portion 80 is constituted by a conical shape in a taper shape sharpened to a lower side. The front end portion 80 is a portion of forming a hole 100 (refer to FIG. 7) constituting a pilot hole for forming an internal thread at the frame 12, and the circular column portion 82 is operated to stabilize a shape of the hole 100. The front end portion 80 and the circular column portion 82 are integrally constituted as a pilot hole forming portion 86.

Further, the front end portion 80 is provided with a spiral projection 80a and a spiral groove 80b formed at a recess portion of the spiral projection 80a. The spiral projection 80a and the spiral groove 80b are provided for pressing the frame 12 to a lower side in so-to-speak burring, in forming the hole 100, different from a spiral projection 80a and the like for forming the internal thread, mentioned later. Further, the spiral projection 80a and the spiral groove 80b need not to be provided necessarily at a total of the front end portion 80 but maybe provided at only a portion of the front end portion 80.

Further, the front end portion 80 may be subjected to dull processing for promoting a friction effect between the front end portion 80 and the frame 12, or may be formed with cemented carbide coating for increasing a strength of the front end portion 80.

The thread forming portion 84 is a portion for forming the internal thread at the hole 100 and is provided with the spiral projection 84a having a diameter larger than that of the circular column portion 82, and a spiral groove 84b provided at a recess portion of the spiral projection 84a. Further, the spiral projection 84a and the spiral groove 84b need not to be provided necessarily at a total of the thread forming portion 84 but may be provided only at a portion of the thread forming portion 84.

Figure 8:
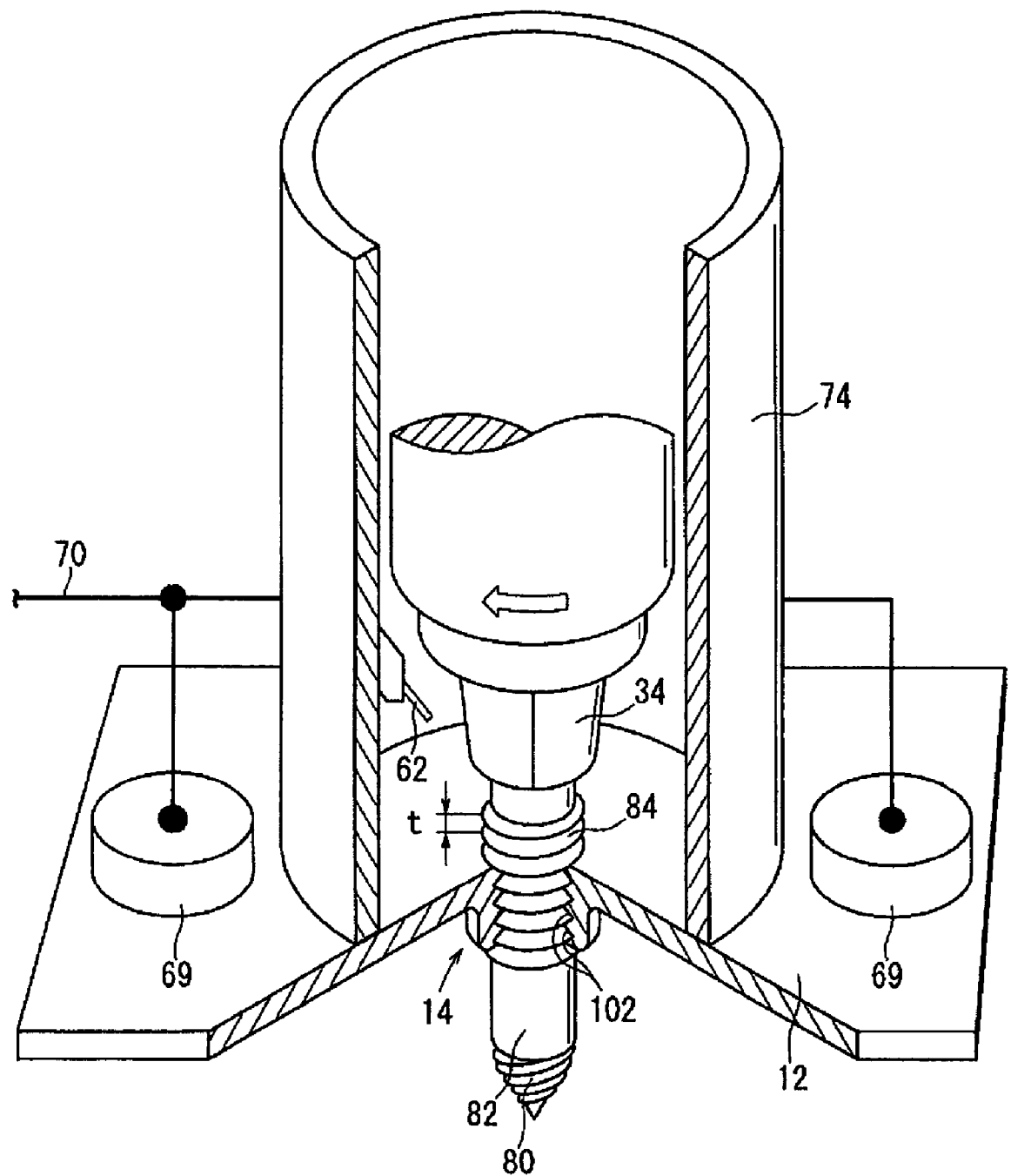
FIG. 8 is a partially broken perspective view showing a condition of forming an internal thread by a thread forming portion.

Further, it is preferable to form the thread by the thread forming portion 84 not by cutting but by roll forming since when the frame 12 is constituted by a thin plate or the like, a material of the frame 12 needs to be effectively utilized as the thread portion 14 (refer to FIG. 8). Further, in roll forming, in comparison with cutting, cutting chips are not produced and therefore, a step or an apparatus for removing cutting chips can be omitted.

Further, according to the first exemplary embodiment, a direction of a spiral of the spiral projection 80a and the spiral groove 80b of the pilot hole forming portion 86 and a direction of a spiral of the spiral projection 84a and the spiral groove 84b of the thread forming portion 84 are provided to constitute the same direction.

Here, it is not necessarily needed that the spiral projection 80a and the spiral groove 80b, and the spiral projection 84a and the spiral groove 84b are constituted by the same pitch, further, the spiral projection 80a needs to be constituted by a shape of not destructing the internal thread in an outer diameter thereof when the thread forming tool 32 is drawn out from the portion of the frame 12 after forming the internal thread by the thread forming portion 84.

Further, although the thread forming portion 84 and the pilot hole forming portion 86 are integrally constituted according to the first exemplary embodiment, the invention is not limited thereto but the thread forming portion 84 and the pilot hole forming portion 86 may be constituted attachably and detachably and in this case, either one thereof can individually be interchanged in accordance with a degree of wear.

Next, an explanation will be given of a thread forming method for forming the thread portion 14 (refer to FIG. 10) at the thread portion processing position P of the frame 12 by using the thread forming device 10a constituted as described above in reference to FIG. 4. Further, in the following explanation, processings are executed in an order of designated step numbers.

Figure 4:
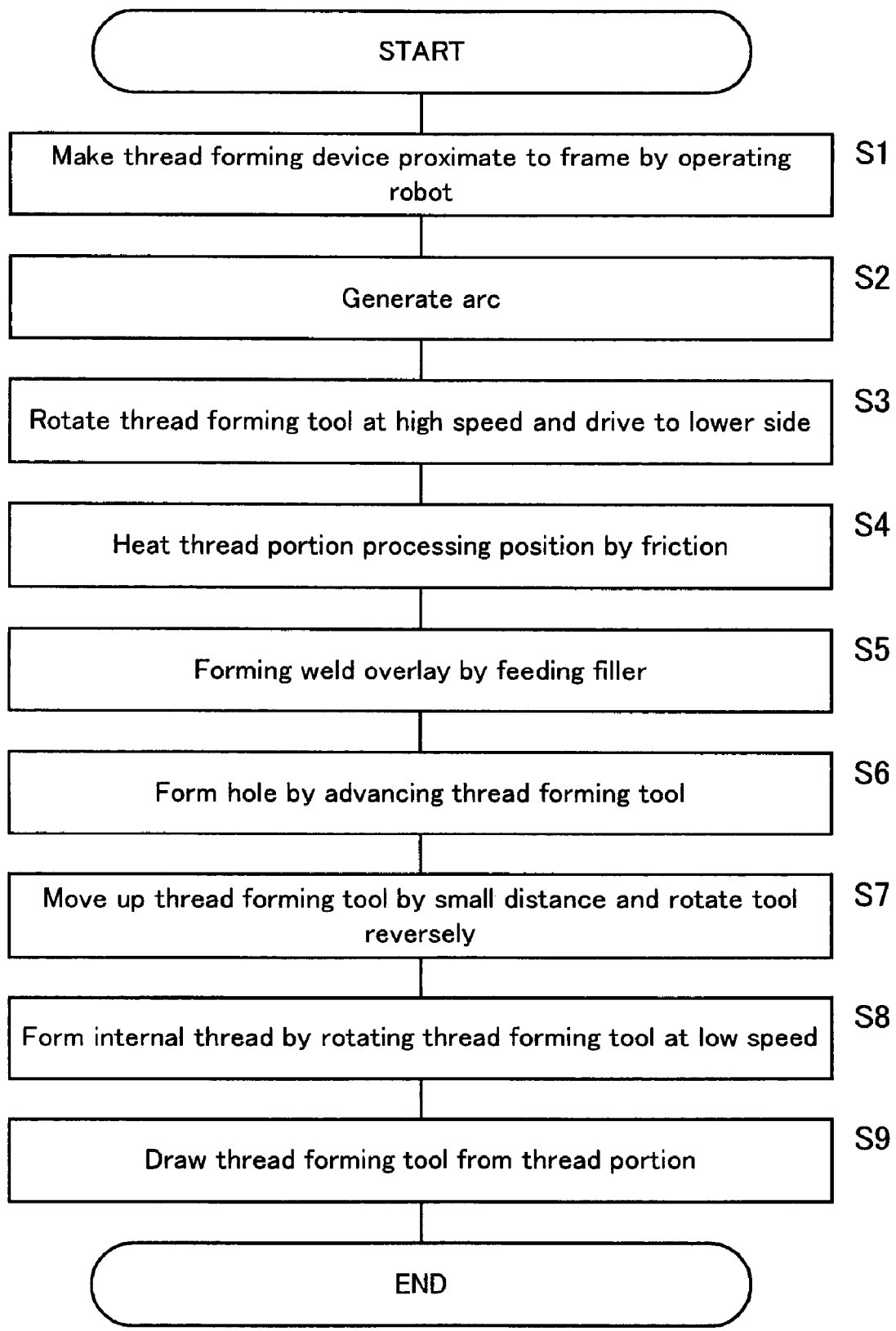
FIG. 4 is a flowchart showing a procedure of a thread forming method according to the first exemplary embodiment.

At step S1 in FIG. 4, the robot 16 is operated under operation of the robot driving portion 22, the thread forming device 10a is made to be proximate to the frame 12 and the negative electrode plate 69 is brought into contact therewith. At this occasion, the previously set thread portion processing position P is arranged on an axis of extracting and retracting the thread forming tool 32.

Figure 5:
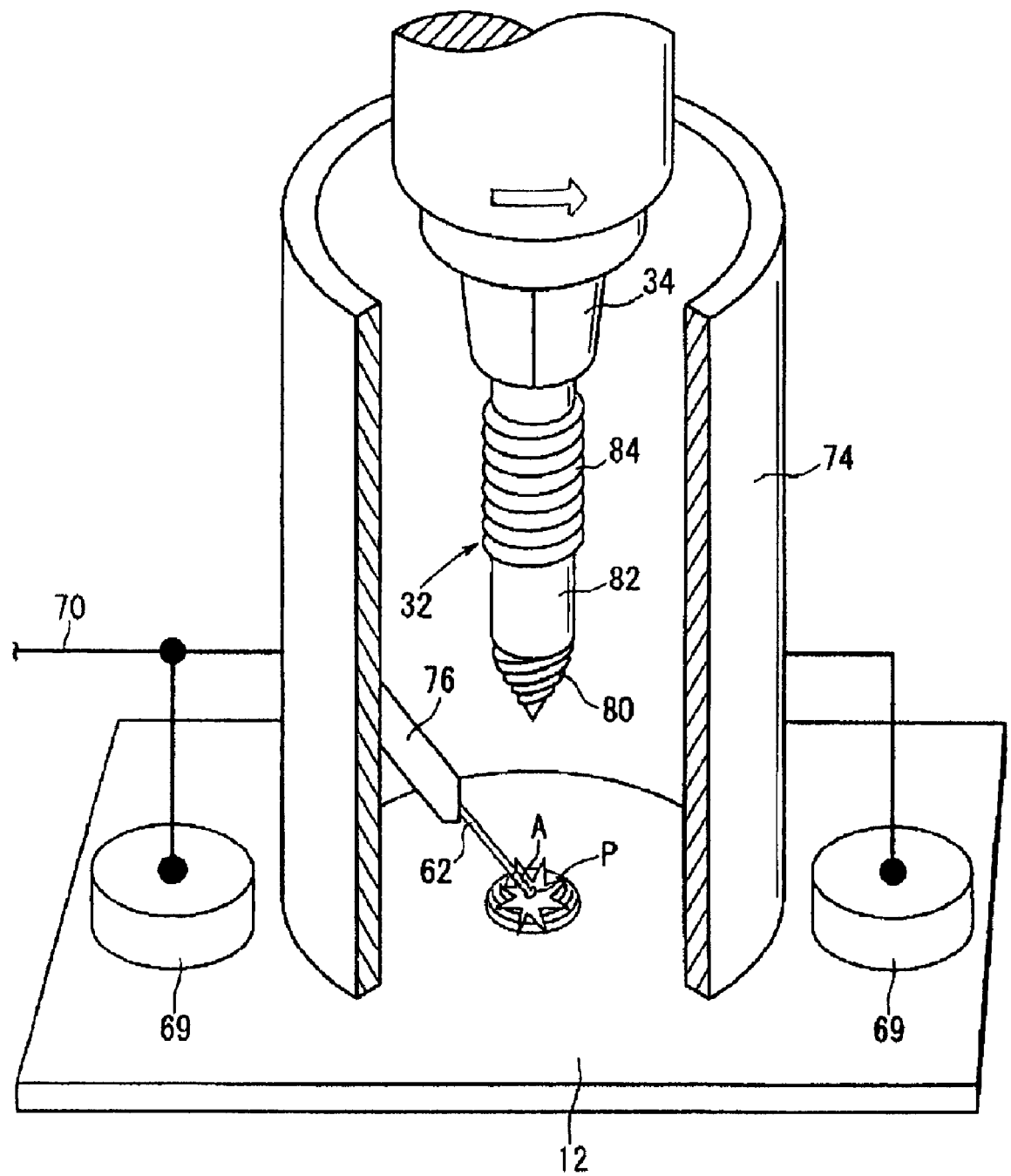
FIG. 5 is a partially broken perspective view showing a condition of carrying out preparatory heating by arc.

At step S2, as shown by FIG. 5, the filler 62 is fed under operation of the filler feeding control portion 26, a front end portion of the filler 62 is projected from the insulating tube 76, thereafter, a high voltage is applied to the positive electrode 68 under operation of the voltage applying control portion 28 to generate arc A. Here, since the front end of the filler 62 is arranged at a vicinity of the thread portion processing position P, the arc A is generated between the front end of the filler 62 and the thread portion processing position P, and the thread portion processing position P is preliminary heated to be softened by the arc A. Further, after an elapse of a predetermined time period, the high voltage is stopped to be applied to extinguish the arc A.

Further, at step S2, the thread portion processing position P can be formed with a weld overlay by generating the arc A by the filler 62 and melting the filler 62 by way of processings the same as those of semiautomatic arc welding. In this case, forming weld overlay at step S5 mentioned later can be omitted.

At step S3, the ball screw 36 and the thread forming tool 32 are rotated at high speed under operation of the first motor 38 and driven to a lower side under operation of the second motor 40. At this occasion, a speed of the second motor 40 is controlled such that the thread forming tool 32 advances by a pertinent speed in accordance with a rotational speed of the first motor 38.

Further, the spiral projection 80a and the spiral groove 80b provided at the pilot hole forming portion 86 according to the embodiment are formed with the spiral in a direction the same as that of the spiral projection 84a and the spiral groove 84b provided at the thread forming portion 84. Therefore, a direction of rotating the thread forming tool 32 in this case is set to a rotational direction (hereinafter, referred to as reverse direction) reverse to a rotational direction (hereinafter, referred to as regular direction) in forming the internal thread by the thread forming portion 84 mentioned later.

Figure 10:
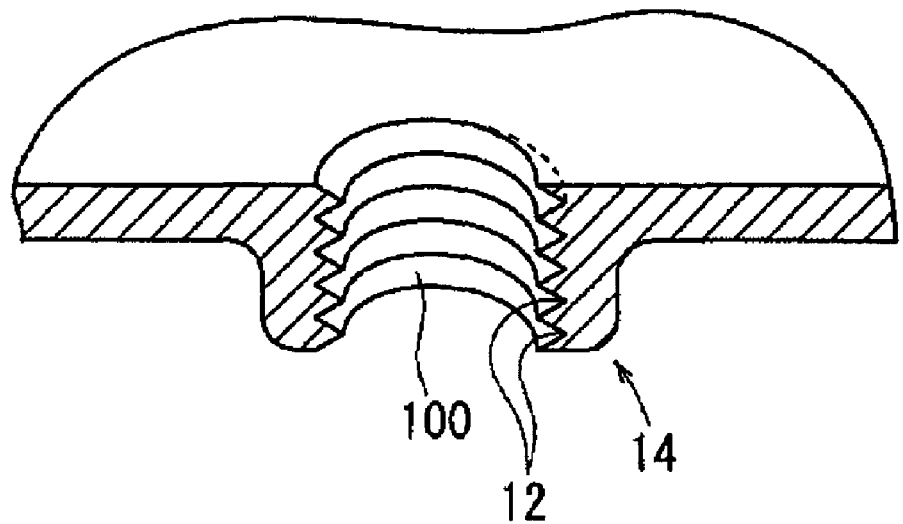
FIG. 10 is a sectional view of a thread portion having a little warp formed when the axis of the thread forming tool and the heating position coincide with each other.
Figure 16A:
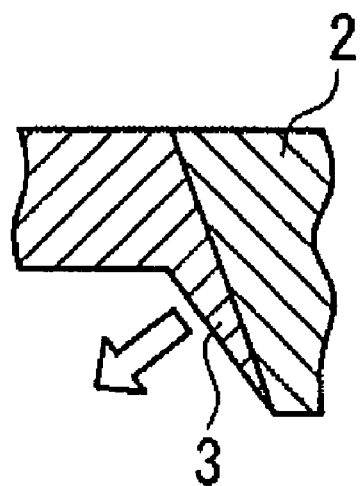
FIG. 16A is an explanatory view showing a pressing direction of a thread forming tool in forming a pilot hole by the method of the related art.
Figure 16B:
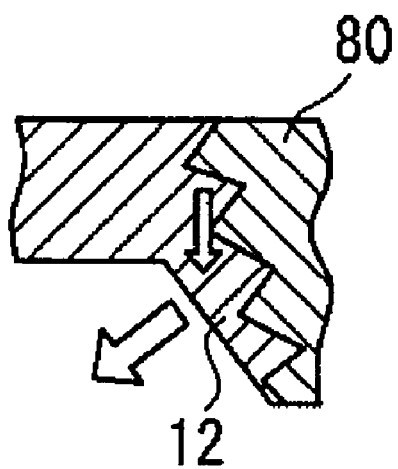
FIG. 16B is an explanatory view showing a pressing direction of a thread forming tool in forming a pilot hole by the invention.

Thereby, in forming the hole 100 at step S6 mentioned later, as shown by FIG. 16B, a direction of a press force exerted to the frame 12 from the front end portion 80 is produced in a lower direction (advancing direction) and a skewed lower direction. Thereby, a diameter thereof can be enlarged while pressing the frame 12 to a lower side, and the hole 100 substantially in a bowl-like shape and the thread portion 14 can be formed as shown by FIG. 10.

Figure 6:
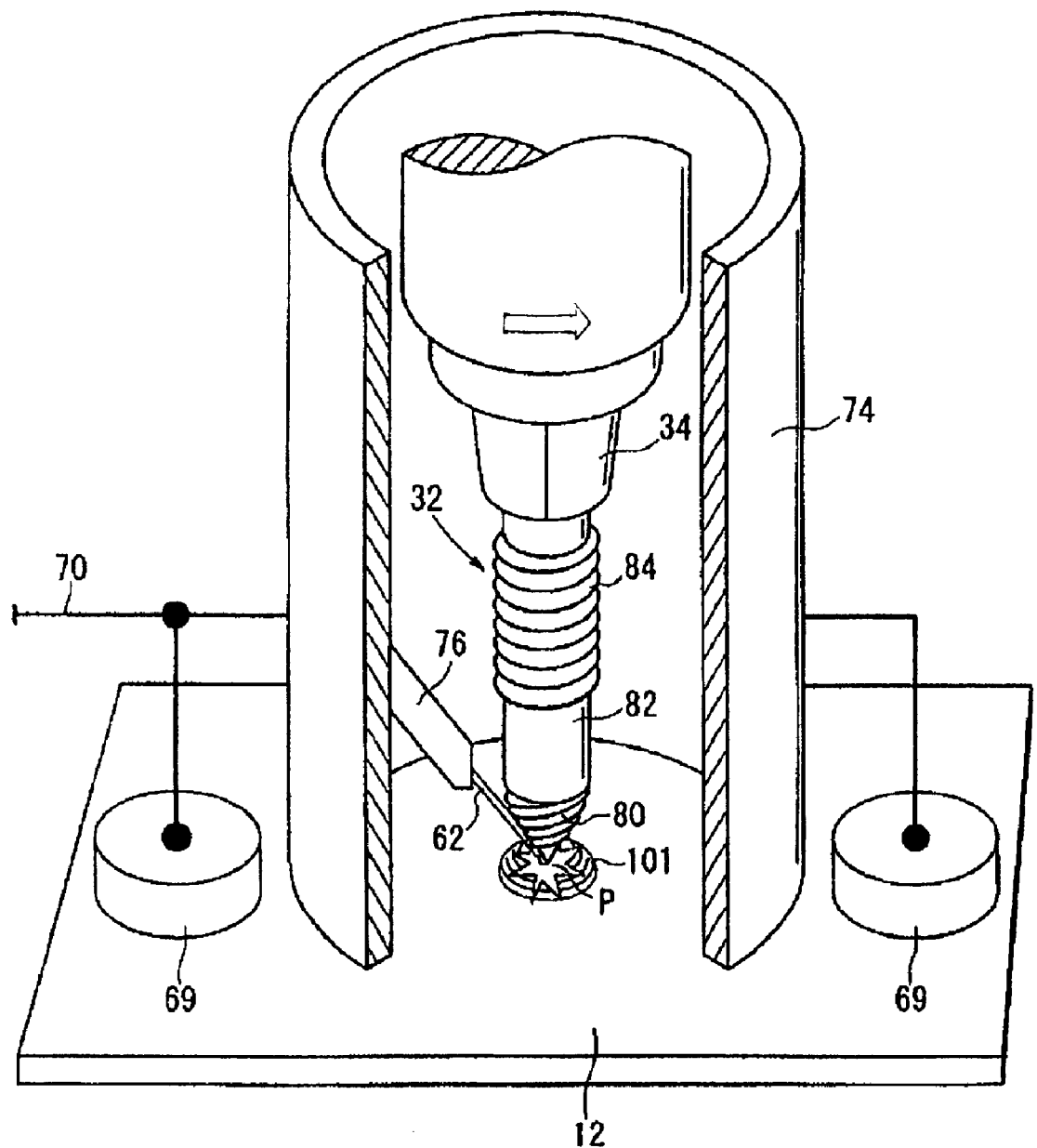
FIG. 6 is a partially broken perspective view showing a condition of forming a weld overlay by generating frictional heat by a thread forming tool and melting a filler.

At step S4, as shown by FIG. 6, after bringing the front end portion 80 of the thread forming tool 32 into contact with the thread portion processing position P, the second motor 40 is driven to control the press force by which the thread forming tool 32 presses the thread portion processing position P by a pertinent force, and the thread portion processing position P is heated by friction heat.

At step S5, the filler 62 is fed again under operation of the filler feeding control portion 26 to bring the front end of the filler 62 into contact with the thread portion processing position P. Since the thread portion processing position P is heated to high temperatures, the filler 62 is melted, the thread portion processing position P is subjected to build up to provide a weld overlay portion 101. After feeding the filler 62 by a predetermined amount, the filler 62 is slightly drawn back to escape.

Further, when a plate thickness of the thread portion processing position P is thick, forming a weld overlay by feeding the filler 62 at step S5 may be omitted.

Figure 7:
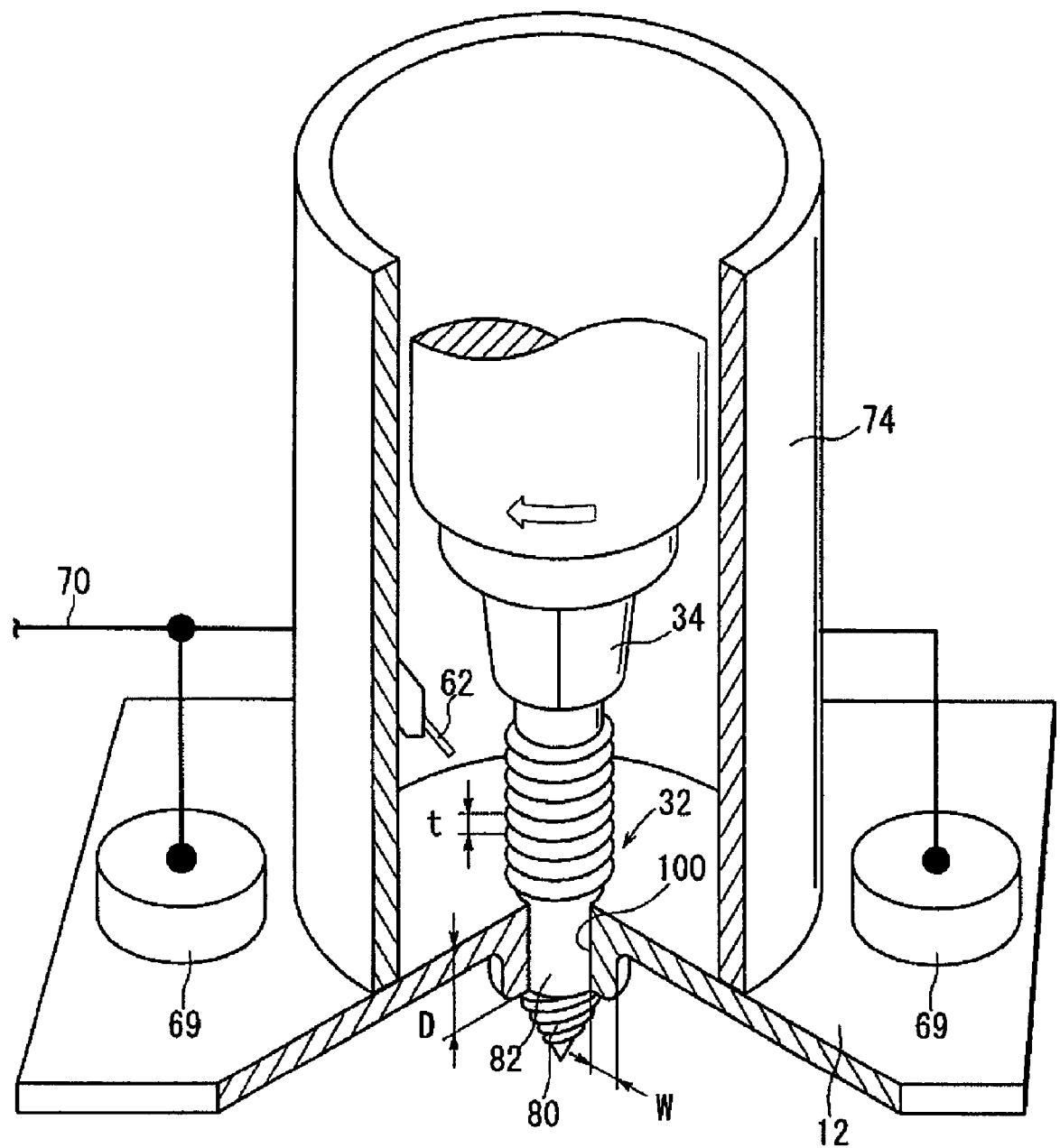
FIG. 7 is a partially broken perspective view showing a condition of forming a hole at a position of processing a thread portion.

At step S6, as shown by FIG. 7, the thread forming tool 32 is further advanced by generating friction heat while maintaining to rotate the thread forming tool 32 to form the hole 100. At first, the hole 100 is formed by a front most portion of the front end portion 80, thereafter, enlarged by a taper face of the front end portion 80, and is stabilized in a shape thereof by inserting the circular column portion 82.

Here, the front end portion 80 is provided with the spiral projection 80a and the spiral groove 80b and the direction of rotating the front end portion 80 is constituted by the reverse direction and therefore, as described above, the hole 100 substantially in the bowl-like shape as shown by FIG. 10 is formed. Thereby, a uniform and sufficient plate thickness W and sufficient depth D are ensured as shown by FIG. 7 at a surrounding of the hole 100.

Further, according to the first exemplary embodiment, since the sufficient plate thickness is ensured at the surrounding of the hole 100, a speed of pressing the front end portion 80 can be driven by a high speed (for example, about 10 mm/sec) and promotion of a processing speed and an operational efficiency can be expected.

At step S7, in a state of maintaining to rotate the thread forming tool 32, the second motor 40 is rotated reversely to the rotational direction at step S6 by the motor control portion 24, the thread forming tool 32 is driven to an upper side by a small distance to be drawn more or less from the frame 12, successively, the first motor 38 is rotated reversely to the rotational direction at step S6 to rotate the thread forming tool 32 in the regular direction.

Meanwhile, when the rotational direction of the thread forming tool 32 is reversed in bringing the thread forming tool 32 into contact with the frame 12 at inside of the frame 12, the friction heat is consumed by temporarily nullifying rotation of the thread forming tool 32 in the midst of the reversely rotating operation, the frame 12 is contracted thereby, and there is a concern of bringing about a drawback of biting the thread forming tool 32 by the frame 12. However, according to the embodiment, as described above, the thread forming tool 32 is drawn from the frame 12 by being driven to the upper side in the state of maintaining to rotate the thread forming tool 32, successively, rotation of the thread forming tool 32 is reversed and therefore, the above-described drawback can be prevented from being brought about.

At step S8, while making the rotational direction of the first motor 38 stay in the regular direction by the motor control portion 24, the rotational direction of the second motor 40 is reversed, and the thread forming tool 32 is driven to the lower side. Further, after inserting the circular column portion 82 into the hole 100, the rotational speed of the first motor 38 is reduced, and the ball screw 36 and the thread forming tool 32 are rotated at low speed. Further, the rotational number of the second motor 40 is controlled to synchronize such that the thread forming tool 32 is advanced by a pitch t (refer to FIG. 7) of the spiral projection 84a of the thread forming portion 84 during a time period of operating the thread forming tool 32 by one rotation. Thereby, as shown by FIG. 8, tapping is carried out such that the spiral projection 84a is threaded to the hole 100 to form the thread portion 14 having an internal thread 102.

At step S9, the first motor 38 and the second motor 40 are rotated reversely to draw the thread forming tool 32 from the thread portion 14. At this occasion, the first motor 38 and the second motor 40 are synchronized to synchronize such that the thread forming tool 32 is moved back by the pitch t during the time period of rotating the thread forming tool 32 by one rotation. After drawing the thread forming portion 84 from the thread portion 14, the thread forming tool 32 may be moved back at high speed.

Thereafter, the thread forming device 10a is separated from the frame by operating the robot 16. When a plurality of the thread portions 14 are formed, the thread forming device 10a may be moved to a successive one of the thread portion processing position P to continue processing by a similar procedure.

Further, in softening processings by heat of frame 12 by step S2 and step S4, either one of the steps may selectively be executed other than executing the both steps of the steps S2, S4 as described above.

Further, it is not necessarily needed to build up the filler 62 at step S2 and step S5, and the steps can be omitted when the plate thickness of frame 12 is sufficient.

As described above, according to the thread forming device 10a according to the first exemplary embodiment, the hole 100 is formed at the thread portion processing position P by the front end portion 80 including the spiral projection 80a and the spiral groove 80b by pressing the thread forming tool 32 to the thread portion processing position P by rotating the thread forming tool 32. Thereby, the plate thickness of the hole 100 can sufficiently be ensured and therefore, the pressing speed of the front end portion 80 can be driven at high speed and the processing speed can be increased.

Further, since the directions of spirals of the pilot hole forming portion 86 and the thread forming portion 84 in the thread forming tool 32 are the same and therefore, the thread forming tool 32 is easily fabricated.

Further, the internal thread 102 is formed by the thread forming portion 84 at the hole 100 having the sufficient plate thickness as described above and therefore, the uniform thread portion 14 substantially in the bowl-like shape can be provided and the strength of the thread portion 14 can be increased.

Further, the forming of the weld overlay is carried out by feeding the filler 62 and therefore, even when the plate thickness of the thread portion processing position P is thin, the invention is applicable, and the thread portion 14 having the high strength can be provided.

Furthermore, since the thread portion processing position P is preliminary heated swiftly by generating the arc A, the time period of generating the friction heat by rotating the thread forming tool 32 while pressing the thread forming tool 32 can be shortened, as a result, the processing time period can be shortened. Further, the press force of the thread forming tool 32 exerted to the thread portion processing position P and the generated heat amount can be reduced and long service life formation can be achieved and an amount of deforming the frame 12 can be reduced by reducing a thermal load and a stress applied to the thread forming tool 32.

Further, since the filler 62 is used as means for generating the arc A, the constitution is simple by dispensing with a torch or the like as heating means, further, a mechanism and a step of heating the heating means proximate to or escape from the thread portion processing position P are not needed.

Figure 9:
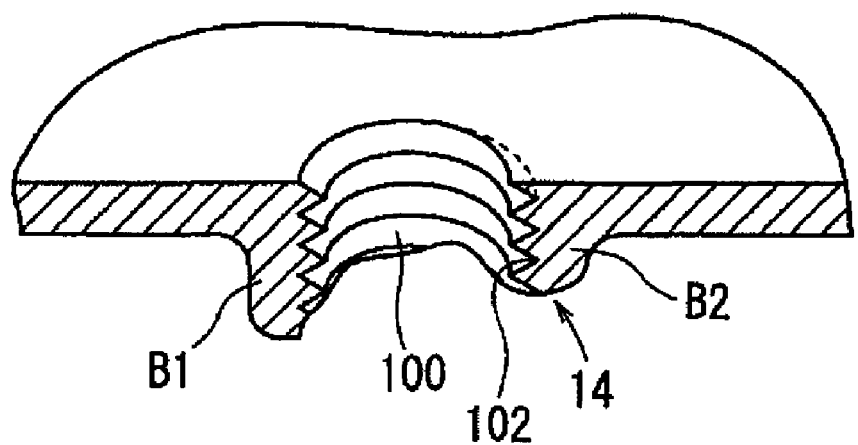
FIG. 9 is a sectional view of a warped thread portion formed when an axis of a thread forming tool and a heating position are shifted from each other.

Meanwhile, when the axis of the thread forming tool 32 and the heating position are shifted from each other, as shown by FIG. 9, portion B1 which is heated sufficiently is considerably deformed, portion B2 which is not heated sufficiently is less deformed to constitute the hole 100 by a warped shape. However, according to the thread forming device 10a according to the embodiment, the front end portion of the filler 62 for generating the arc A is arranged substantially on an upper side of the thread portion processing position P and therefore, the thread portion processing position P can be heated by substantially constituting a center thereof. Therefore, as shown by FIG. 10, the thread portion 14 which is less warped can be formed.

Figure 11:
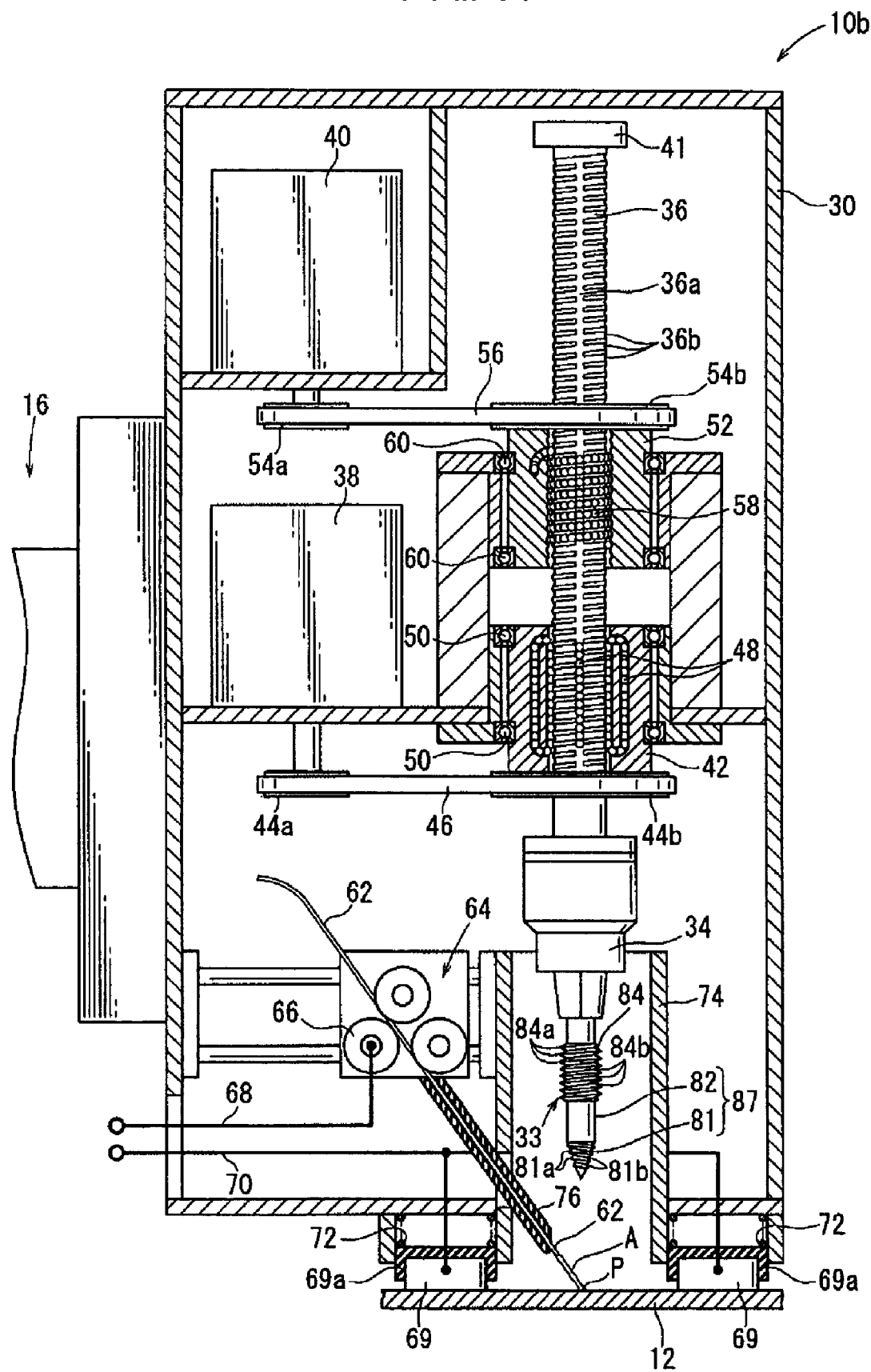
FIG. 11 is a side sectional view of a thread forming device according to a second exemplary embodiment of the invention.

Next, an explanation will be given of a second exemplary embodiment of the invention in reference to FIG. 11. FIG. 11 shows a side sectional view of a thread forming device 10b according to the second exemplary embodiment. Further, portions in FIG. 11 attached with notations the same as those of the thread forming device 10a according to the first exemplary embodiment are constructed by the same or similar constitutions and achieve the same or similar function and effect to omit a detailed explanation thereof.

When the thread forming device 10b is compared with the thread forming device 10a, the thread forming device 10b differs therefrom in that a thread forming tool 33 is provided in place of the thread forming tool 32.

Figure 12:
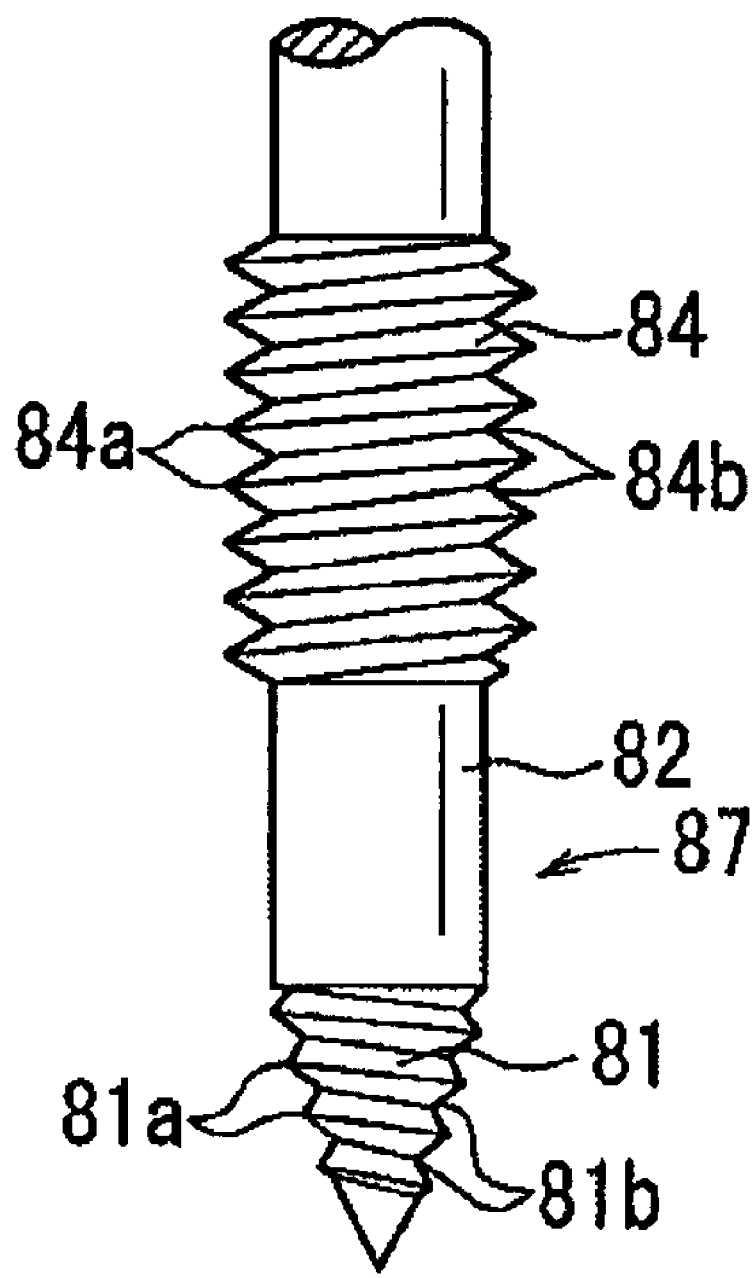
FIG. 12 is a front view enlarging a thread forming tool according to the second exemplary embodiment.

FIG. 12 shows a front view enlarging the thread forming tool 33. As shown by FIG. 11 and FIG. 12, the thread forming tool 33 includes a front end portion 81 in a taper shape, a pilot hole forming portion 87 including a circular column portion 82 provided continuously to an upper side of the front end portion 81, and a thread forming portion 84 provided continuously to an upper side thereof.

In comparison with the front end portion 80 according to the first exemplary embodiment, the front end portion 81 differs therefrom in that a direction of a spiral in a spiral projection 81a and a spiral groove 81b is constituted by a direction reverse thereto. That is, according to the thread forming tool 33 according to the embodiment, the direction of the spiral of the pilot hole forming portion 87 and the direction of the spiral of the spiral projection 84a and the spiral groove 84b in the thread forming portion 84 are constituted by directions reverse to each other.

Figure 13:
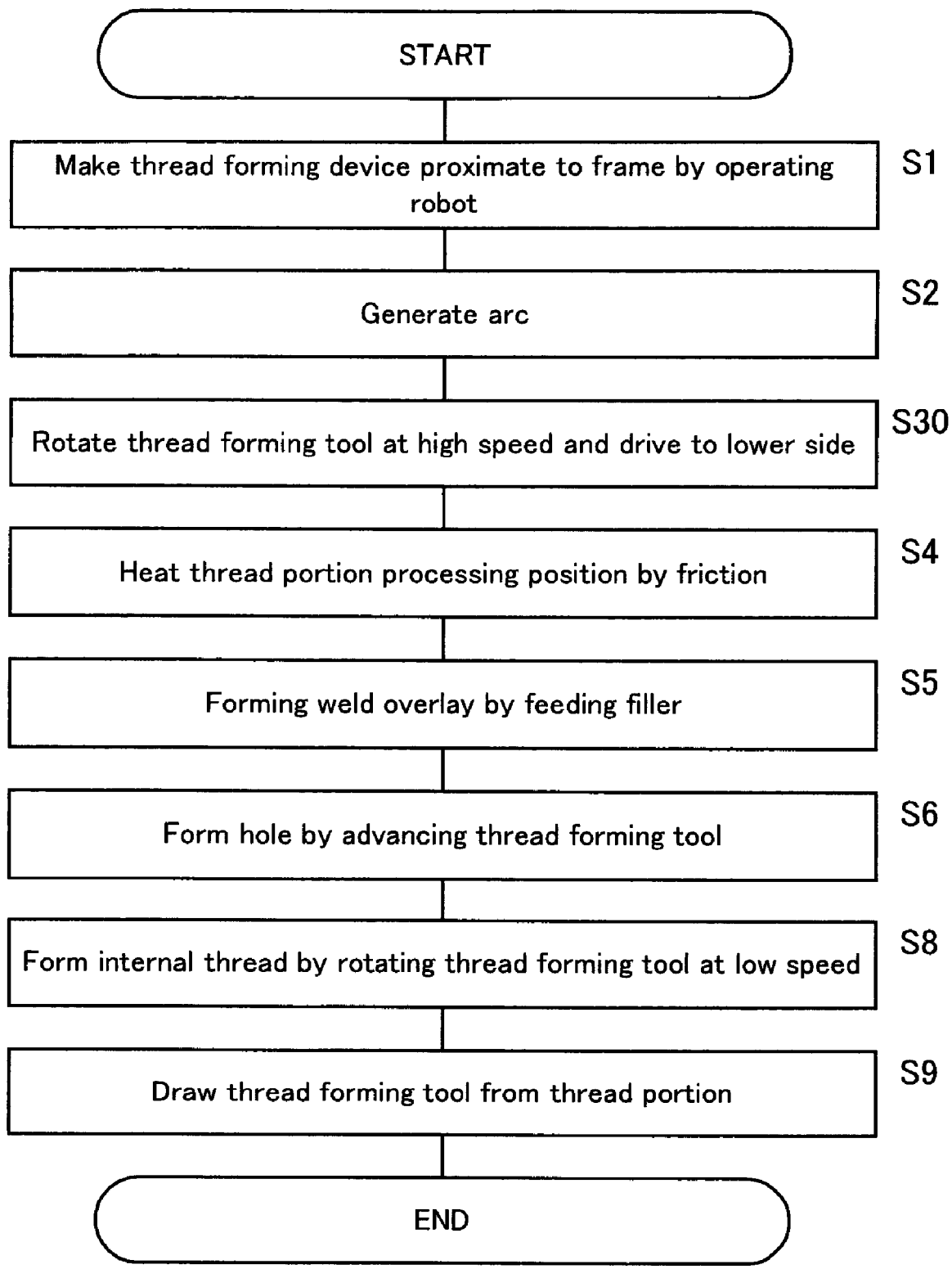
FIG. 13 is a flowchart showing a procedure of a thread forming method according to the second exemplary embodiment.
Figure 14:
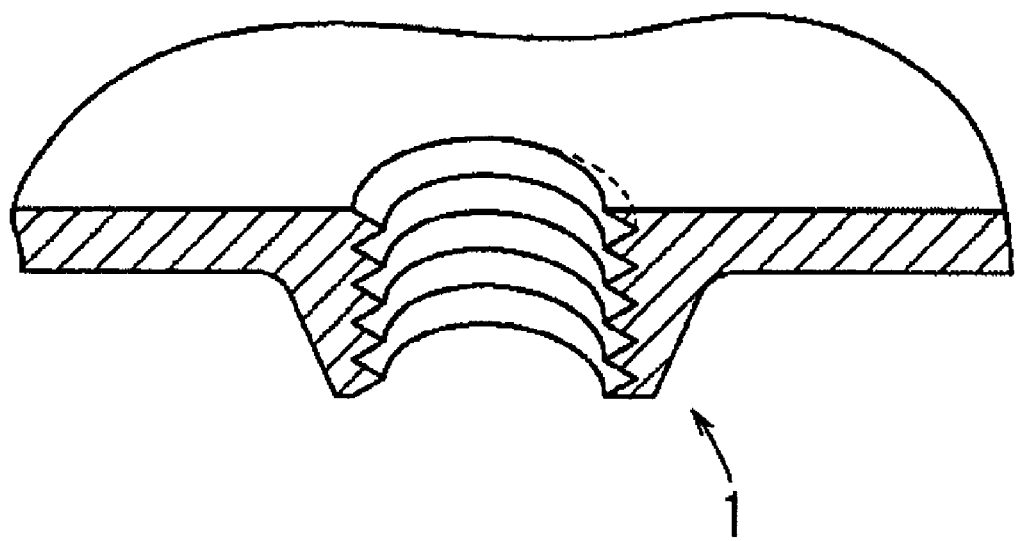
FIG. 14 is a sectional view of a thread portion formed by a method of a related art.
Figure 15:
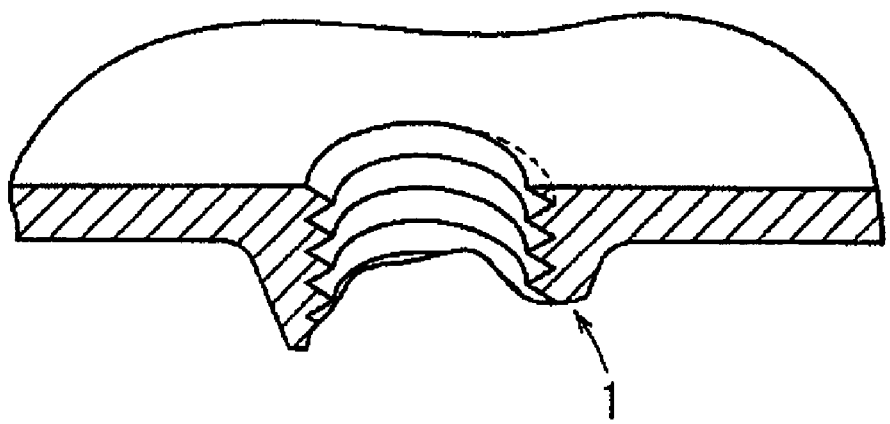
FIG. 15 is a sectional view of a thread portion formed by the method of the related art and broken.

Next, an explanation will be given of a thread forming method for forming the thread portion 14 (refer to FIG. 10) at the thread portion processing position P of the frame 12 by using the thread forming device 10b constituted as described above in reference to FIG. 13. FIG. 13 is a flowchart showing a procedure of the thread forming method according to the second exemplary embodiment. Further, similar steps are executed in the flowchart of FIG. 13 and the flowchart of FIG. 4 other than a point of difference that step S30 is executed in place of step S3 and step S7 is omitted and therefore, a detailed explanation thereof will be omitted.

At step S30, the ball screw 36 and the thread forming tool 32 are rotated at high speed under operation of the first motor 38 and are driven to the lower side under operation of the second motor 40. At this occasion, the speed of the second motor 40 is controlled such that the thread forming tool 32 is advanced by pertinent speed in accordance with the rotational speed of the first motor 38.

Further, the spiral is formed in the spiral projection 81a and the spiral groove 81b provided at the pilot hole forming portion 87 according to the second exemplary embodiment in a direction reverse to that of the spiral projection 84a and the spiral groove 84b provided at the thread forming portion 84 as described above and therefore, the rotational direction of the thread forming tool 32 in this case is set to the rotational direction in forming the internal thread by the thread forming portion 84, that is, in the regular direction. Thereby, the direction of the press force from the front end portion 81 to the frame 12 is produced in the lower direction (advancing direction) and the skewed lower direction and therefore, also according to the embodiment, the hole 100 substantially in the bowl-like shape and the thread portion 14 as shown by FIG. 10 can be formed.

In this way, according to the thread forming device 10b according to the second exemplary embodiment, the thread portion 14 is formed by using the thread forming tool 33 as described above and therefore, the step (step S7) of driving the thread forming tool to the upper side by the small distance by rotating reversely the thread forming tool can be omitted between when the pilot hole is formed (step S6) and when the thread is formed (step S8) can be omitted in comparison with the embodiment 1, the control of the thread forming device 10b can be simplified and the processing time period can be shortened.

Although the invention has been explained in accordance with the respective embodiments as mentioned above, the invention is not limited thereto but various constitutions can naturally be adopted without deviating from the gist of the invention.

For example, although in the above-described respective embodiments, an explanation has been given of an example of generating the arc A for preliminary heating the thread portion processing position P, the heating means may be constituted by a torch or the like. Further, the heating means may be provided at a back face of the thread portion processing position P and preparatory heating may be carried out from the back face.

Further, it is not necessarily needed to provide the circular column portions 82 of the thread forming tools 32, 33 according to the above-described respective embodiments but may be omitted in accordance with a condition of use or the like.

Further, the thread forming device according to the above-described respective embodiments are selectively applicable in consideration of a mode of use or an installing location, further, fabrication cost or the like.

What is claimed is:

1. A method of forming a thread in a metal plate comprising the steps of:
    providing a thread forming tool comprised of a pilot hole forming portion having a tapered shape, the pilot hole forming portion having a first spiral groove, and a thread forming portion having a second spiral groove;
    rotating the thread forming tool in a first direction that is opposite to a direction of the first spiral groove of the pilot hole forming portion;
    lowering the thread forming tool toward the metal plate such that the pilot hole forming portion contacts the metal plate;
    forming a hole in the metal plate with the pilot hole forming portion while simultaneously rotating the thread forming tool in the first direction;
    rotating the thread forming tool in a second direction that is the same as a direction of the second spiral groove of the thread forming portion;
    lowering the thread forming tool such that the thread forming portion contacts the metal plate; and
    forming an internal thread at the hole with the thread forming portion while simultaneously rotating the thread forming tool in the second direction.

2. The method of claim 1, wherein the direction of the first spiral groove is the same as the direction of the second spiral groove, and wherein the rotation of the thread forming tool in the second direction is opposite to the rotation of the thread forming tool in the first direction.

3. The method of claim 2, wherein prior to the step of lowering the thread forming tool such that the thread forming portion contacts the metal plate, the method further comprises the step of raising the thread forming tool such that the thread forming tool is drawn from the metal plate.

4. The method of claim 3, wherein prior to the step of forming a hole in the metal plate with the pilot hole forming portion, the method further comprises the step of melting a filler to form a weld overlay at a thread processing position.

5. The method of claim 1, wherein the direction of the first spiral groove is the reverse to the direction of the second spiral groove, and wherein the rotation of the thread forming tool in the second direction is the same as the rotation of the thread forming tool in the first direction.

6. The method of claim 5, wherein prior to the step of forming a hole in the metal plate with the pilot hole forming portion, the method further comprises the step of melting a filler to form a weld overlay at a thread processing position.

* * * * *